(12) United States Patent
Nagaoka

(10) Patent No.: US 9,230,309 B2
(45) Date of Patent: Jan. 5, 2016

(54) IMAGE PROCESSING APPARATUS AND IMAGE PROCESSING METHOD WITH IMAGE INPAINTING

(71) Applicant: Panasonic Intellectual Property Management Co., Ltd., Osaka-shi, Osaka (JP)

(72) Inventor: Eiichi Nagaoka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 14/243,913

(22) Filed: Apr. 3, 2014

(65) Prior Publication Data

US 2014/0301646 A1    Oct. 9, 2014

(30) Foreign Application Priority Data

Apr. 5, 2013  (JP) ................................. 2013-079231
Mar. 13, 2014 (JP) ................................. 2014-050332

(51) Int. Cl.
*G06K 9/46* (2006.01)
*G06T 5/00* (2006.01)

(52) U.S. Cl.
CPC ....... *G06T 5/005* (2013.01); *G06T 2207/20104* (2013.01)

(58) Field of Classification Search
None
See application file for complete search history.

(56) References Cited

U.S. PATENT DOCUMENTS

| 5,887,080 | A | 3/1999 | Tsubusaki et al. |
| 6,289,123 | B1 | 9/2001 | Xiaomang et al. |
| 6,583,823 | B1 | 6/2003 | Shimada et al. |
| 7,411,612 | B2 | 8/2008 | Yamada et al. |
| 7,961,951 | B2 * | 6/2011 | Tsutsumi ...................... 382/199 |
| 8,023,014 | B2 * | 9/2011 | Kim et al. ..................... 348/251 |
| 8,027,535 | B2 | 9/2011 | Sanami |
| 8,208,752 | B2 | 6/2012 | Ishii |
| 8,306,324 | B2 | 11/2012 | Sanami |
| 8,472,076 | B2 | 6/2013 | Ikeda |

(Continued)

FOREIGN PATENT DOCUMENTS

| JP | H05-216992 A | 8/1993 |
| JP | H07-078263 A | 3/1995 |

(Continued)

OTHER PUBLICATIONS

The Office Action from the corresponding Japanese Patent Application No. 2014-050332 issued on Mar. 10, 2015.

(Continued)

*Primary Examiner* — Eueng-Nan Yeh
(74) *Attorney, Agent, or Firm* — Shinjyu Global IP

(57) ABSTRACT

The image processing apparatus inpaints a part of an image displayed on the display unit. The control unit determines a removal patch including a removal region and a first non-removal region that is a region that does not include the removal region in the image, and replace pixel values of pixels included in the removal region with pixel values of pixels outside the removal patch. The control unit calculates a distance from the removal region for pixels included in the first non-removal region, blends pixel values of the pixels included in at least a portion of the first non-removal region with the pixel values of the pixels outside the removal patch based on the calculated distance to obtain blended pixel values, and replaces the pixel values of the pixels included in the at least a portion of the first non-removal region with the blended pixel values.

11 Claims, 17 Drawing Sheets

(56) References Cited

U.S. PATENT DOCUMENTS

| | | |
|---|---|---|
| 2002/0015526 A1 | 2/2002 | Nomura et al. |
| 2004/0208395 A1 | 10/2004 | Nomura |
| 2005/0057657 A1 | 3/2005 | Yamada et al. |
| 2005/0089241 A1 | 4/2005 | Kawanishi et al. |
| 2005/0129326 A1 | 6/2005 | Matama |
| 2006/0256383 A1 | 11/2006 | Yamakawa |
| 2007/0035790 A1 | 2/2007 | Kotani |
| 2007/0201744 A1 | 8/2007 | Sanami |
| 2008/0158386 A1 | 7/2008 | Miki |
| 2008/0240608 A1 | 10/2008 | Ishii |
| 2010/0066761 A1 | 3/2010 | Tousch et al. |
| 2011/0032581 A1 | 2/2011 | Ikeda |
| 2011/0304637 A1 | 12/2011 | Sanami |
| 2012/0230591 A1 | 9/2012 | Shibata |
| 2013/0016246 A1* | 1/2013 | Hatanaka et al. .......... 348/222.1 |
| 2013/0051679 A1 | 2/2013 | Tsuda et al. |
| 2013/0287259 A1 | 10/2013 | Ishii |

FOREIGN PATENT DOCUMENTS

| | | |
|---|---|---|
| JP | H07-282219 A | 10/1995 |
| JP | H09-016368 A | 1/1997 |
| JP | H09-270022 A | 10/1997 |
| JP | H11-039480 A | 2/1999 |
| JP | H11-103447 A | 4/1999 |
| JP | 2003-108980 A | 4/2003 |
| JP | 2003-123066 A | 4/2003 |
| JP | 2004-318696 A | 11/2004 |
| JP | 2005-092284 A | 4/2005 |
| JP | 3824237 B2 | 9/2006 |
| JP | 2006-279442 A | 10/2006 |
| JP | 2006-279443 A | 10/2006 |
| JP | 2006-311080 A | 11/2006 |
| JP | 2007-060325 A | 3/2007 |
| JP | 2007-110329 A | 4/2007 |
| JP | 2007-128238 A | 5/2007 |
| JP | 2007-226671 A | 9/2007 |
| JP | 2008-092447 A | 4/2008 |
| JP | 2008-164758 A | 7/2008 |
| JP | 2008-244867 A | 10/2008 |
| JP | 2008-299516 A | 12/2008 |
| JP | 2008-299591 A | 12/2008 |
| JP | 2008-300990 A | 12/2008 |
| JP | 2009-181528 A | 8/2009 |
| JP | 2010-511215 A | 4/2010 |
| JP | 2011-035567 A | 2/2011 |
| JP | 2011-055488 A | 3/2011 |
| JP | 4652978 B2 | 3/2011 |
| JP | 2011-170838 A | 9/2011 |
| JP | 2011-170840 A | 9/2011 |
| JP | 2011-191860 A | 9/2011 |
| JP | 2012-088796 A | 5/2012 |
| JP | 2013-045316 A | 3/2013 |
| WO | 2009/142333 A1 | 11/2009 |
| WO | 2011/061943 A1 | 5/2011 |
| WO | 2013/073168 A1 | 5/2013 |

OTHER PUBLICATIONS

The Office Action from the corresponding Japanese Patent Application No. 2014-050324 issued on Mar. 17, 2015.
The Office Action from the corresponding Japanese Patent Application No. 2014-050326 issued on Apr. 14, 2015.

* cited by examiner

FIG. 9

| 7 | 7 | 8 | 8 | 8 | 8 | 8 | 8 | 9 | 9 | 9 | 10 | 11 | 12 | 13 | 14 |
|---|---|---|---|---|---|---|---|---|---|---|----|----|----|----|----|
| 6 | 6 | 7 | 7 | 7 | 7 | 7 | 7 | 8 | 8 | 8 | 9  | 10 | 11 | 12 | 13 |
| 5 | 5 | 6 | 6 | 6 | 6 | 6 | 6 | 7 | 7 | 7 | 8  | 9  | 10 | 11 | 12 |
| 4 | 4 | 5 | 5 | 5 | 5 | 5 | 5 | 6 | 6 | 6 | 7  | 8  | 9  | 10 | 11 |
| 3 | 3 | 4 | 4 | 4 | 4 | 4 | 4 | 5 | 5 | 5 | 6  | 7  | 8  | 9  | 10 |
| 2 | 2 | 3 | 3 | 3 | 3 | 3 | 3 | 4 | 4 | 4 | 5  | 6  | 7  | 8  | 9  |
| 1 | 1 | 2 | 2 | 2 | 2 | 2 | 2 | 3 | 3 | 3 | 4  | 5  | 6  | 7  | 8  |
| 0 | 0 | 1 | 1 | 1 | 1 | 1 | 1 | 2 | 2 | 2 | 3  | 4  | 5  | 6  | 7  |
| 0 | 0 | 0 | 0 | 0 | 0 | 0 | 0 | 1 | 1 | 1 | 2  | 3  | 4  | 5  | 6  |
| 0 | 0 | 0 | 0 | 0 | 0 | 0 | 0 | 0 | 0 | 0 | 1  | 2  | 3  | 3  | 5  |
| 0 | 0 | 0 | 0 | 0 | 0 | 0 | 0 | 0 | 0 | 0 | 1  | 2  | 3  | 4  | 5  |
| 0 | 0 | 0 | 0 | 0 | 0 | 0 | 0 | 0 | 0 | 0 | 1  | 2  | 3  | 4  | 5  |
| 0 | 0 | 0 | 0 | 0 | 0 | 0 | 0 | 0 | 0 | 0 | 1  | 2  | 3  | 4  | 5  |
| 0 | 0 | 0 | 0 | 0 | 0 | 0 | 0 | 0 | 0 | 0 | 1  | 2  | 3  | 4  | 5  |
| 0 | 0 | 0 | 0 | 0 | 0 | 0 | 0 | 0 | 0 | 0 | 1  | 2  | 3  | 4  | 5  |
| 0 | 0 | 0 | 0 | 0 | 0 | 0 | 0 | 0 | 0 | 0 | 1  | 2  | 3  | 4  | 5  |

IMAGE PROCESSING APPARATUS AND IMAGE PROCESSING METHOD WITH IMAGE INPAINTING

PRIORITY

This application claims priority under 35 U.S.C. §119 to Japanese Patent Applications No. 2013-079231 filed on Apr. 5, 2013 and No 2014-50332 filed on Mar. 13, 2014. The entire disclosure of Japanese Patent Applications No. 2013-079231 and No. 2014-50332 is hereby incorporated herein by reference.

TECHNICAL FIELD

The present disclosure relates to an image processing technique for inpainting a portion of an image that is not as intended by a user.

BACKGROUND

There are cases where an image includes an unnecessary object, which is an object thought to be unnecessary by a user (such as facial blemishes or moles, or electric cables in the background). Conventionally, a function for performing inpainting processing after removing such an unnecessary object from the image has been proposed. For example, an image processing method has been proposed in which inpainting is performed by attaching the pixel values in a non-missing region to a missing region, which is a region from which an unnecessary object was removed. Specifically, patch sets including a missing patch, which is an image of a region that includes a missing region, and a reference patch, which is an image of a region that does not include a missing region, are provided, patch sets in which the missing patch and the reference patch are comparatively similar are selected, and then a patch set in which the missing patch image and the reference patch image are comparatively similar is selected based on the relationship between estimated pixel values in a missing region of the missing patch and the corresponding pixel values of the reference patch. The missing patch is then inpainted based on the reference patch in the patch set that was selected (e.g., see WO 2011/061943).

SUMMARY

The present disclosure provides an image processing apparatus and an image processing method that are effective for obtaining a more natural processing result in image inpainting processing for removing an unnecessary object from an image.

The image processing apparatus according to one aspect of the present disclosure is an image processing apparatus that inpaints a inpainting target region in an image to be displayed. The image processing apparatus comprises: a display unit configured to display the image constituted by a predetermined number of pixels; and a control unit configured to control the display unit. The control unit is configured to determine a removal patch including a removal region that is the inpainting target region and a first non-removal region that is a region that does not include the removal region in the image to be displayed on the display unit, and replace pixel values of pixels included in the removal region with pixel values of pixels outside the removal patch. The control unit is further configured to calculate a distance from the removal region for pixels included in the first non-removal region, blend pixel values of the pixels included in at least a portion of the first non-removal region with the pixel values of the pixels outside the removal patch based on the calculated distance to obtain blended pixel values, and replace the pixel values of the pixels included in the at least a portion of the first non-removal region with the blended pixel values.

The image processing method according to another aspect of the present disclosure is an image processing method for inpainting a inpainting target region in an image to be displayed on a display unit, the image processing method including: determining a removal patch including a removal region that is the inpainting target region and a non-removal region that is a region that does not include the removal region in the image to be displayed on the display unit; replacing pixel values of pixels included in the removal region with pixel values of pixels outside the removal patch; calculating a distance from the removal region for pixels included in the non-removal region; blending pixel values of the pixels included in at least a portion of the non-removal region with the pixel values of the pixels outside the removal patch based on the calculated distance to obtain blended pixel values; and replacing the pixel values of the pixels included in the at least a portion of the non-removal region with the blended pixel values.

The image processing apparatus and the image processing method of the present disclosure are effective for obtaining a more natural processing result in image inpainting processing for removing an unnecessary object from an image.

BRIEF DESCRIPTION OF THE DRAWINGS

FIG. 9 is a diagram showing the distance that the non-removal region is separated from the removal region for each pixel in the reduced image inpainting processing.

FIG. 12 is a diagram showing the distance that the non-removal region is separated from the removal region for each pixel.

FIG. 17 is a diagram showing the distance that the non-removal region is separated from the removal region for each pixel according to the variation.

DETAILED DESCRIPTION

Hereinafter, embodiments of the present disclosure will be described in detail with reference to the drawings as appropriate. Note that there are cases where descriptions in greater detail than necessary will not be given. For example, there are cases where detailed descriptions will not be given for well-known matter, and where redundant descriptions will not be given for configurations that are substantially the same. The purpose of this is to avoid unnecessary redundancy in the following description and to facilitate understanding by a person skilled in the art. It will be apparent to those skilled in the art from this disclosure that the following descriptions of the embodiments are provided for illustration only and not for the purpose of limiting the invention as defined by the appended claims and their equivalents.

Note that the accompanying drawings and following description are provided for sufficient understanding of the present disclosure by a person skilled in the art, and are not intended to limit the subject matter recited in the claims.

Embodiment 1

Embodiment 1 will be described below with reference to FIGS. 1 to 17.

1. Configuration

Figure 1:
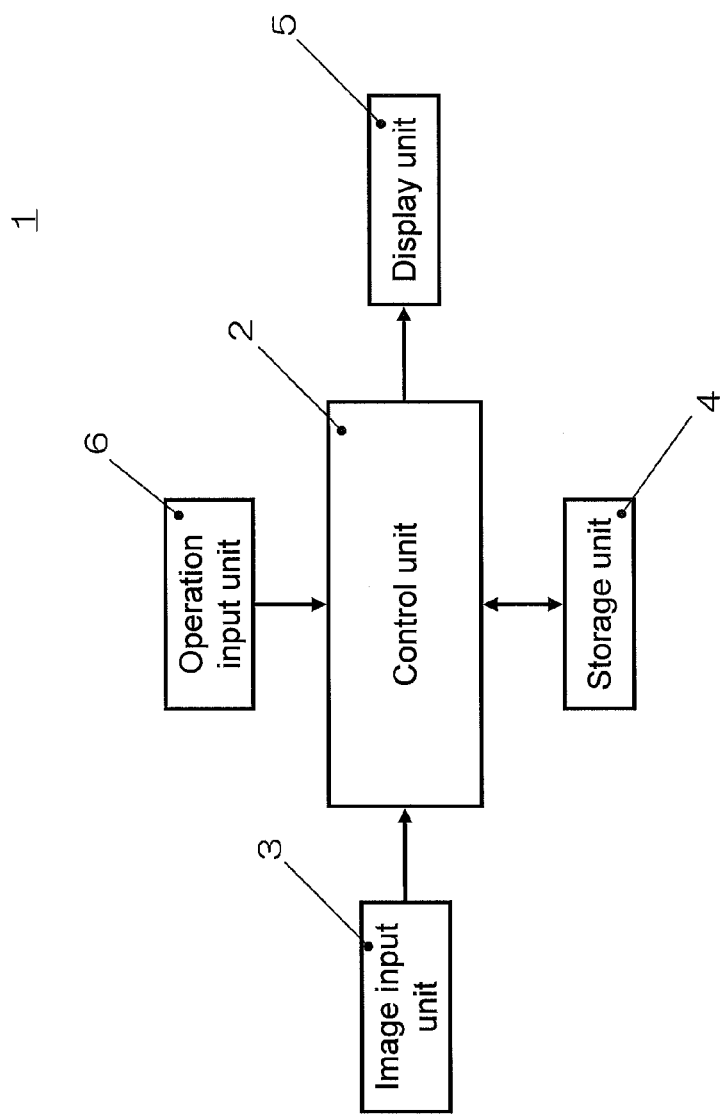
FIG. 1 is a block diagram showing a schematic configuration of an image processing apparatus.

FIG. 1 is a block diagram schematically showing the configuration of an image processing apparatus 1. The image processing apparatus 1 is any electronic device, such as a digital still camera, a digital video camera, a personal computer, a mobile phone, or an information terminal. The image processing apparatus 1 includes a control unit 2 (example of a control unit) that performs overall control of operations of units in the image processing apparatus 1; an image input unit 3, such as a camera or a scanner, that includes a lens and an imaging device and captures images; a storage unit 4 that records various types of information such as captured images; a display unit 5 (example of a display unit), such as a liquid crystal monitor or an organic EL display, that displays image information such as images; and an operation input unit 6, such as a touch panel, that receives an input of various types of operations from a user.

The control unit 2 includes a processor such as a CPU, and executes operations of the image processing apparatus 1 by executing processing according to a predetermined program. The storage unit 4 may be constituted by a hard disk, a silicon disk, an SD card (semiconductor memory), or the like. The storage unit 4 may be constituted by an element that performs temporary storage, such as a cache or a RAM.

Also, the operation input unit 6 may be a pointing device such as a mouse or a tablet, or may be a keyboard. Alternatively, the operation input unit 6 may be an electronic pen of any of various systems, or the like.

2. Operations 2-1. Operations of Image Processing Apparatus

Operations of the image processing apparatus 1 configured as described above will be described below with reference to the flowchart of FIG. 2.

In accordance with an instruction from a user, the control unit 2 of the image processing apparatus 1 generates a reduced image from an image captured by the image input unit 3. Alternatively, an image captured by the image input unit 3 is stored in the storage unit 4 in advance, that image is read out from the storage unit 4, and the reduced image is generated. The generated reduced image is then displayed on the display unit 5 (step S101).

Next, the control unit 2 recognizes an arbitrary region that was designated by the user in the reduced image, for example, and generates a binary image in which the pixels included in the designated region make up a removal region (step S102).

Next, the control unit 2 performs reduced image inpainting processing on the removal region, as well as stores the procedure of the inpainting processing (step S103).

Then control unit 2 then uses the stored inpainting processing procedure to perform inpainting processing on the image from before the reduction performed in step S101 (original image) (step S104).

Figure 2:
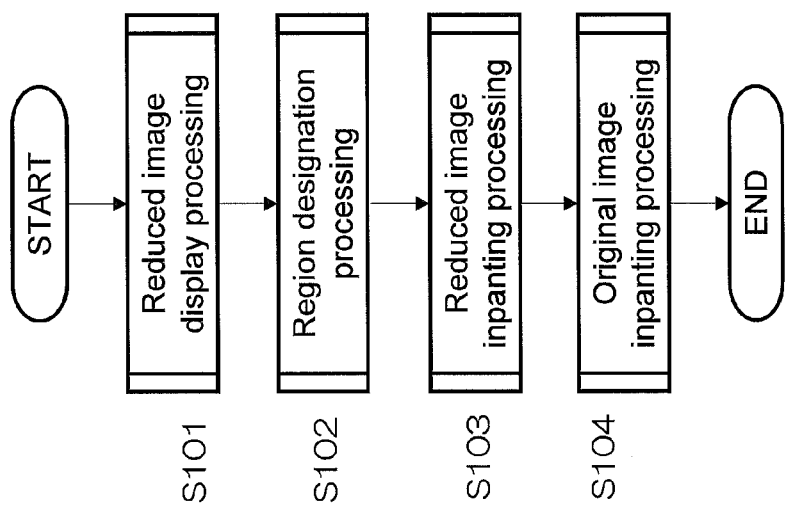
FIG. 2 is a flowchart showing operations of the image processing apparatus.

The following is a more detailed description of operations in the reduced image display processing (step S101), the region designation processing (step S102), the reduced image inpainting processing (step S103), and the original image inpainting processing (step S104) shown in the flowchart of FIG. 2.

2-2. Operations in Reduced Image Display Processing

Figure 3:
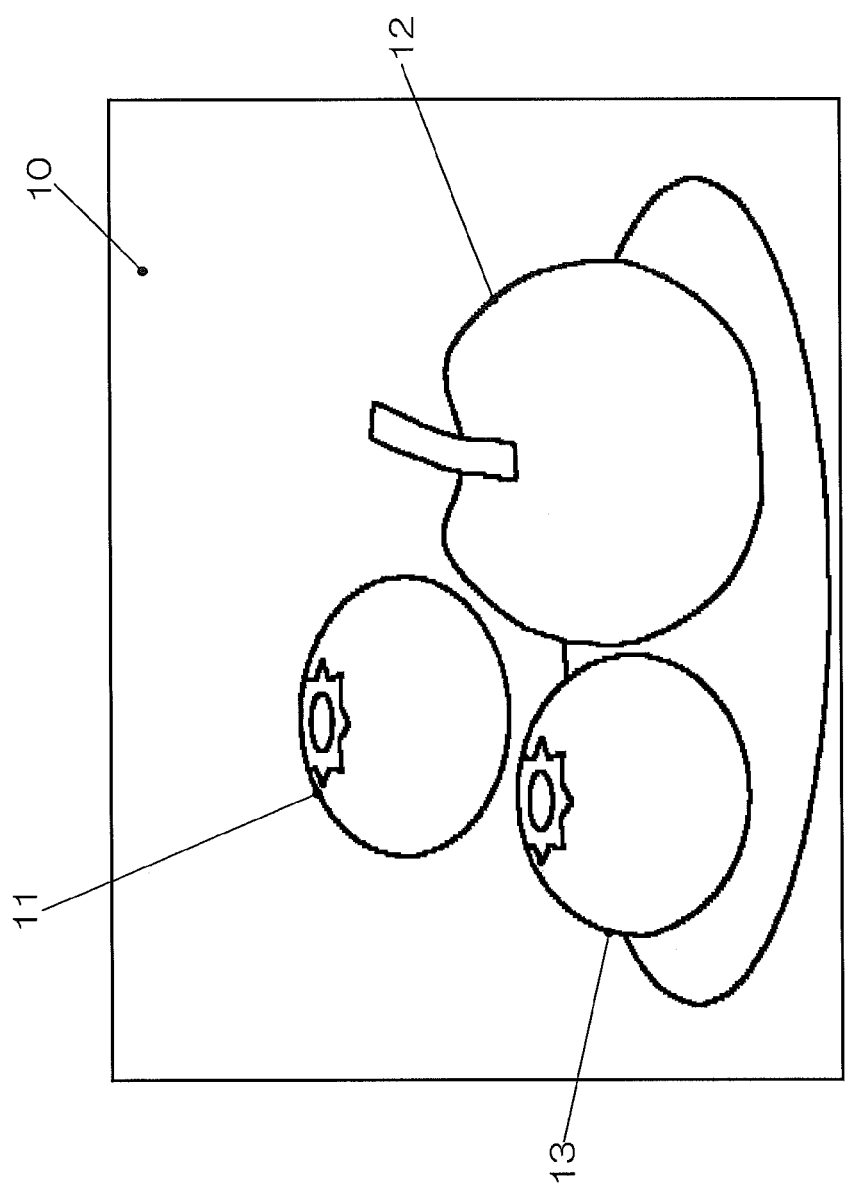
FIG. 3 is a diagram showing an image resulting from reduction processing.

FIG. 3 is a diagram showing a state in which a reduced image is displayed on a liquid crystal screen.

An image captured by the image input unit 3 or an image stored in the storage unit 4 is constituted from 4,480 pixels horizontally and 3,360 pixels vertically, for example. Each pixel has three pieces of digital data (referred to hereinafter as the "pixel value") respectively indicating a luminance Y and color differences U and V. Note that since the image data format allows conversion between color spaces such as the RGB color space and the Lab color space, processing may be performed using the results of conversion into another color space as the pixel value.

The number of pixels in the liquid crystal screen serving as the display unit 5 is generally lower than with this type of image constituted from a large number of pixels (referred to hereinafter as the "original image"). The following description will take the example of a liquid crystal screen constituted from 640 display pixels horizontally and 480 display pixels vertically.

The control unit 2 generates a reduced image by reducing the original image to 1/K. The following description will take the example of K=7. First, the original image is evenly divided into square blocks made up of K×K (i.e., 7×7) pixels. This results in 640 blocks horizontally and 480 blocks vertically. In view of this, it is sufficient to select the center pixel of each block, and use the pixel values of the center pixels as the pixel value of the reduced image 10 (thinning processing). Alternatively, a configuration is possible in which average values are calculated for the three luminance Y and color difference U and V components of the pixel values of the 49 pixels included in each block, and the resulting average values are used as the pixel values of the reduced image 10 (averaging processing).

FIG. 3 shows an example where the reduced image generated by the control unit 2 in this way is displayed on the liquid crystal screen serving as the display unit 5. The reduced image 10 obtained by reducing the original image to 1/K includes a first subject 11, a second subject 12, a third subject 13, and the like. The following description will take the example of the case where the first subject 11 among these three subjects is set as the unnecessary object and removed, and then inpainting processing is performed on the removal region.

2-3. Operations in Region Designation Processing

Figure 4:
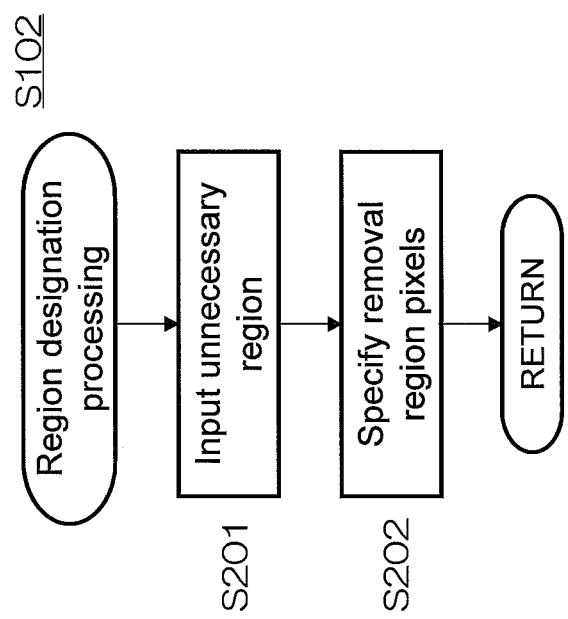
FIG. 4 is a flowchart showing operations in region designation processing.
Figure 5:
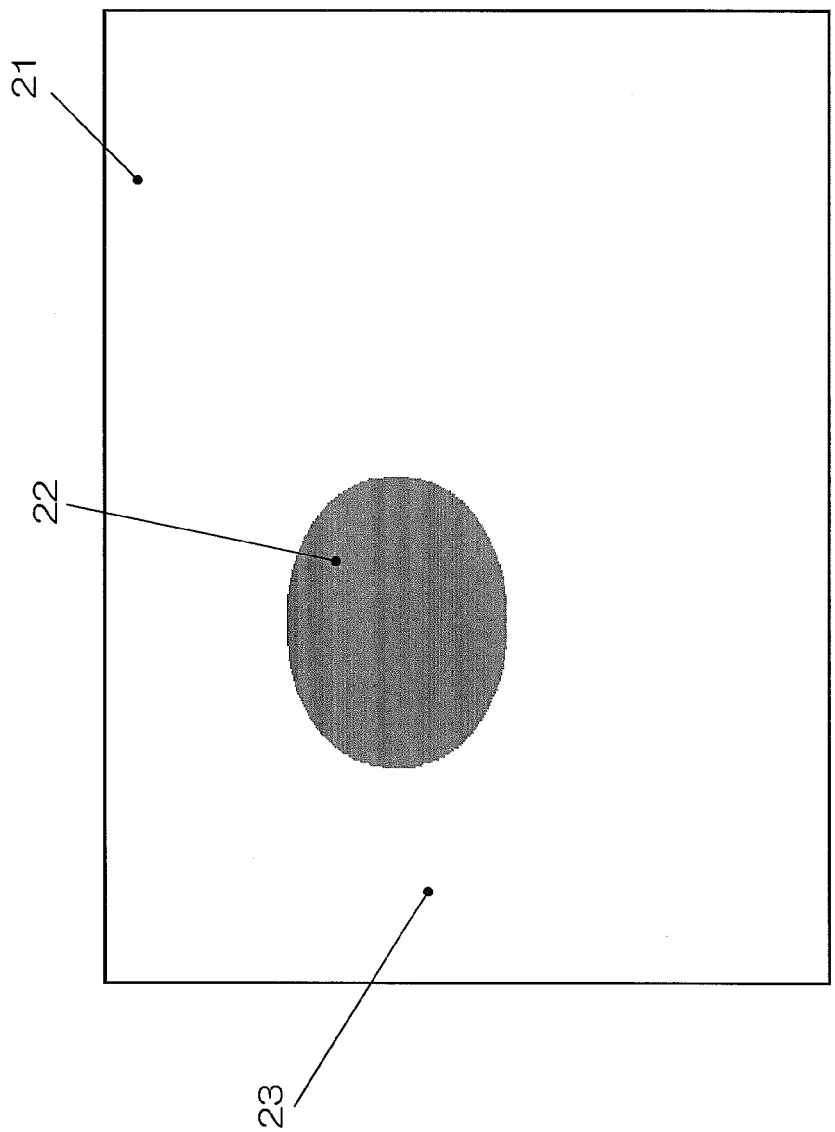
FIG. 5 is a diagram for describing the state of a binary image generated as a result of the region designation processing.

FIG. 4 is a flowchart showing operations in region designation processing performed by the image processing apparatus 1. Also, FIG. 5 is a diagram for describing a state in which a removal region designated as an unnecessary object is generated as a binary image.

The control unit 2 of the image processing apparatus 1 displays the reduced image 10 on the liquid crystal screen serving as the display unit 5 (FIG. 3), and then prompts the user to perform input. The user touches the liquid crystal screen with their fingertip and traces the outline portion of the first subject 11. The control unit 2 successively records the position of the fingertip detected by the touch panel serving as the operation input unit 6, and obtains a closed curve that encloses the first subject 11. The interior of this closed curve is then determined to be an unnecessary object (step S201).

Note that the designation of the unnecessary object does not need to be dependent on user input as described above, and the unnecessary object may be detected automatically. For example, a configuration is possible in which a line-shaped flaw such as debris or a scratch is automatically detected, and that flaw is automatically detected as the unnecessary object. Alternatively, it is also effective to use a procedure of dividing the screen into several candidate regions (e.g., the first subject 11, the second subject 12, and the third subject 13) by determining differences in color, brightness, or the like. The user may be allowed to select one or more regions from among the candidates.

After the unnecessary object has been recognized as described above, the control unit 2 generates a binary image in which the pixels included in the unnecessary object make up a removal region. Specifically, the binary image is generated such that the values of the pixels inside the closed curve that encloses the first subject 11 are 1 (true), and the values of the pixels outside the closed curve are 0 (false) (step S202). FIG. 5 shows an example of a binary image 21 generated in this way. The number of pixels in the binary image is the same as the number of pixels in the reduced image 10. In FIG. 5, the pixels that have the value of 1 and are included in a removal region 22 are shown in gray, and the pixels that have the value of 0 and are included in a non-removal region 23 are shown in white. The same follows the figures in the description below.

2-4. Operations in Reduced Image Inpainting Processing

Figure 6:
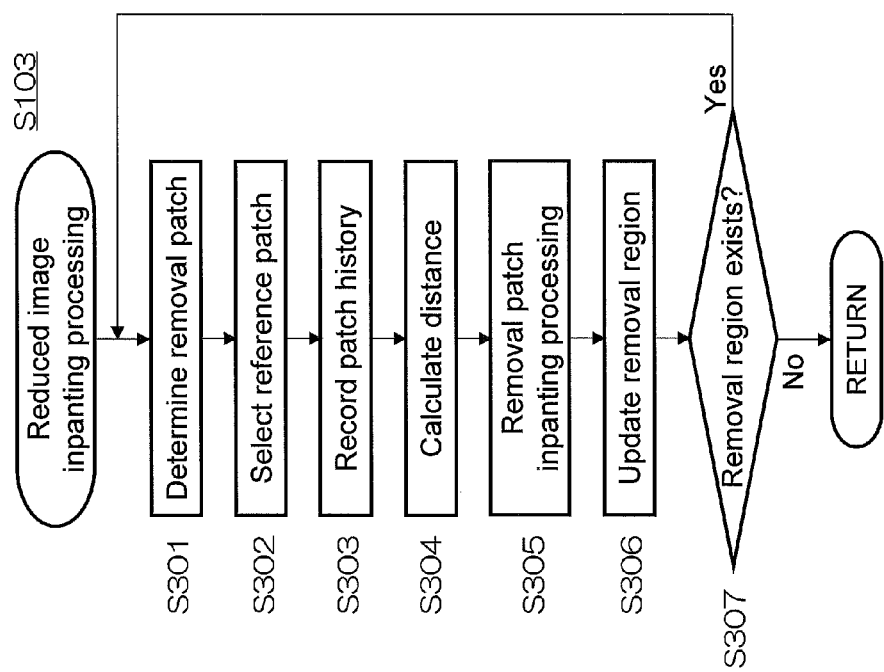
FIG. 6 is a flowchart showing operations in reduced image inpainting processing.

FIG. 6 is a flowchart showing operations in reduced image inpainting processing performed by the image processing apparatus 1. FIGS. 7 to 13 show operations in the reduced image inpainting processing.

Figure 7:
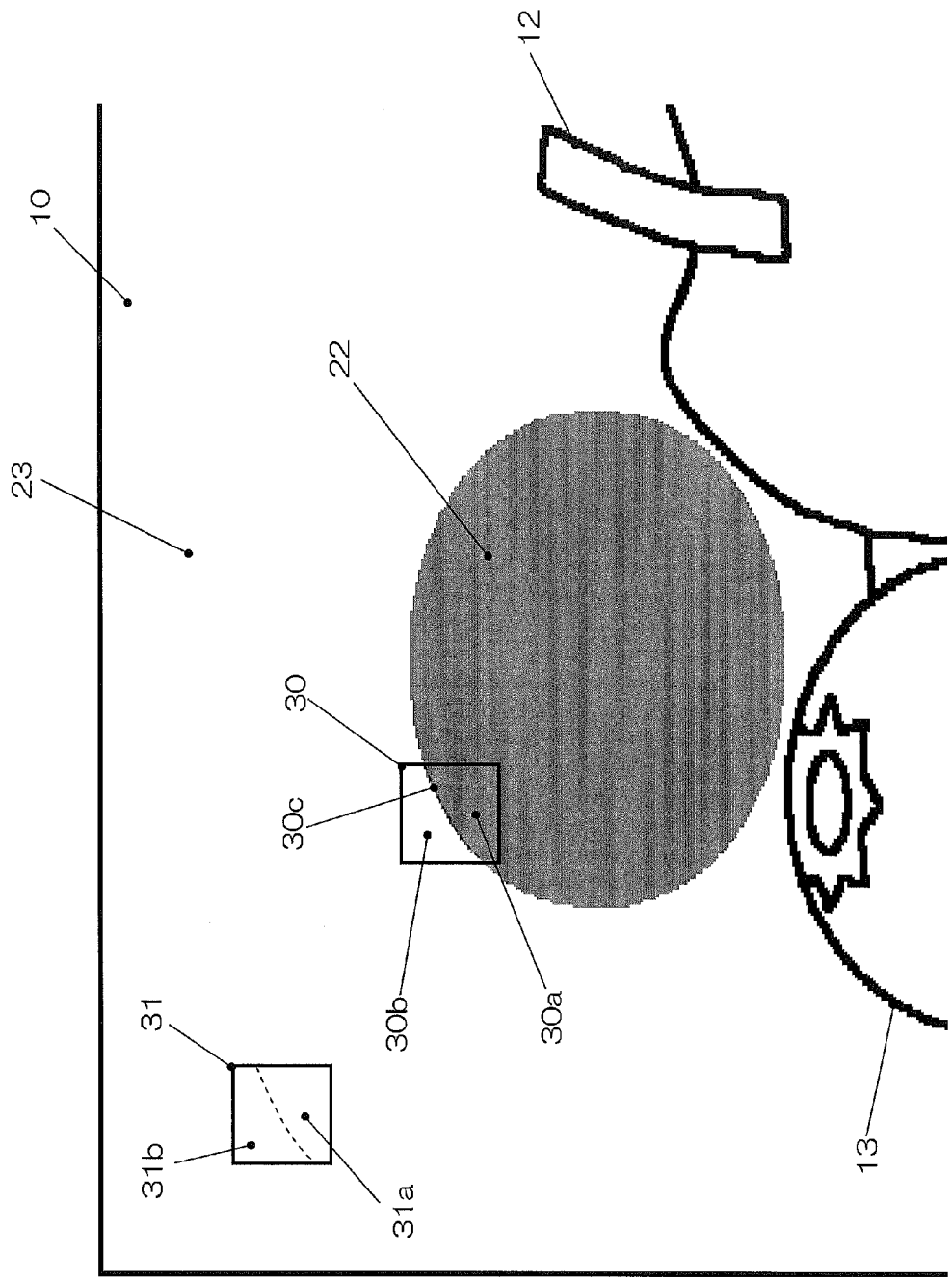
FIG. 7 is a diagram for describing the relationship between a first removal patch and a reference patch in the reduced image inpainting processing.

The control unit 2 performs image inpainting processing on the reduced image 10, specifically on the removal region 22 that underwent the binary image processing (step S103 in FIG. 2). FIG. 7 is an enlarged view of the periphery of the removal region 22 of the binary image superimposed on the reduced image 10 in FIG. 3 that is subjected to processing.

2-4-1. Processing in First Iteration

First, the control unit 2 determines a square removal patch 30 whose center is on an edge portion of the removal region 22 (the boundary of the region, which is a boundary line portion between the interior and exterior of the region) (step S301). As shown in FIG. 7, the removal patch 30 is arranged so as to span the removal region 22 and the non-removal region 23. The removal patch 30 has 16 pixels horizontally and 16 pixels vertically, for example. These 256 pixels can be divided into the following two regions. Specifically, the first region is made up of the pixels that are included in a removal region 30a of the removal patch 30, and the second region is made up of the pixels that are included in a non-removal region 30b. A boundary 30c between these two regions conforms to the edge portion of the removal region 22.

Next, the control unit 2 selects a reference patch 31 that corresponds to the removal patch 30 (step S302). The reference patch 31 is a square region made up of only pixels in the non-removal region 23, and has the same number of pixels as the removal patch 30. Since the reduced image 10 includes many candidates that satisfy this condition, the reference patch is selected using the following procedure. Specifically, a degree of similarity is obtained for the non-removal region 30b of the removal patch 30 and a corresponding partial region 31b of each reference patch 31. The reference patch 31 that has the highest degree of similarity is selected from among the candidates. Here, the degree of similarity is calculated using a method such as the following. Specifically, the sum of squares is obtained for the difference between the pixel values of the pixels included in the non-removal region 30b of the removal patch 30 and the pixel values of the corresponding pixels included in the partial region 31b of each reference patch 31. It is sufficient that the smaller the sum of squares is, the higher the degree of similarity is determined to be.

Figure 8:
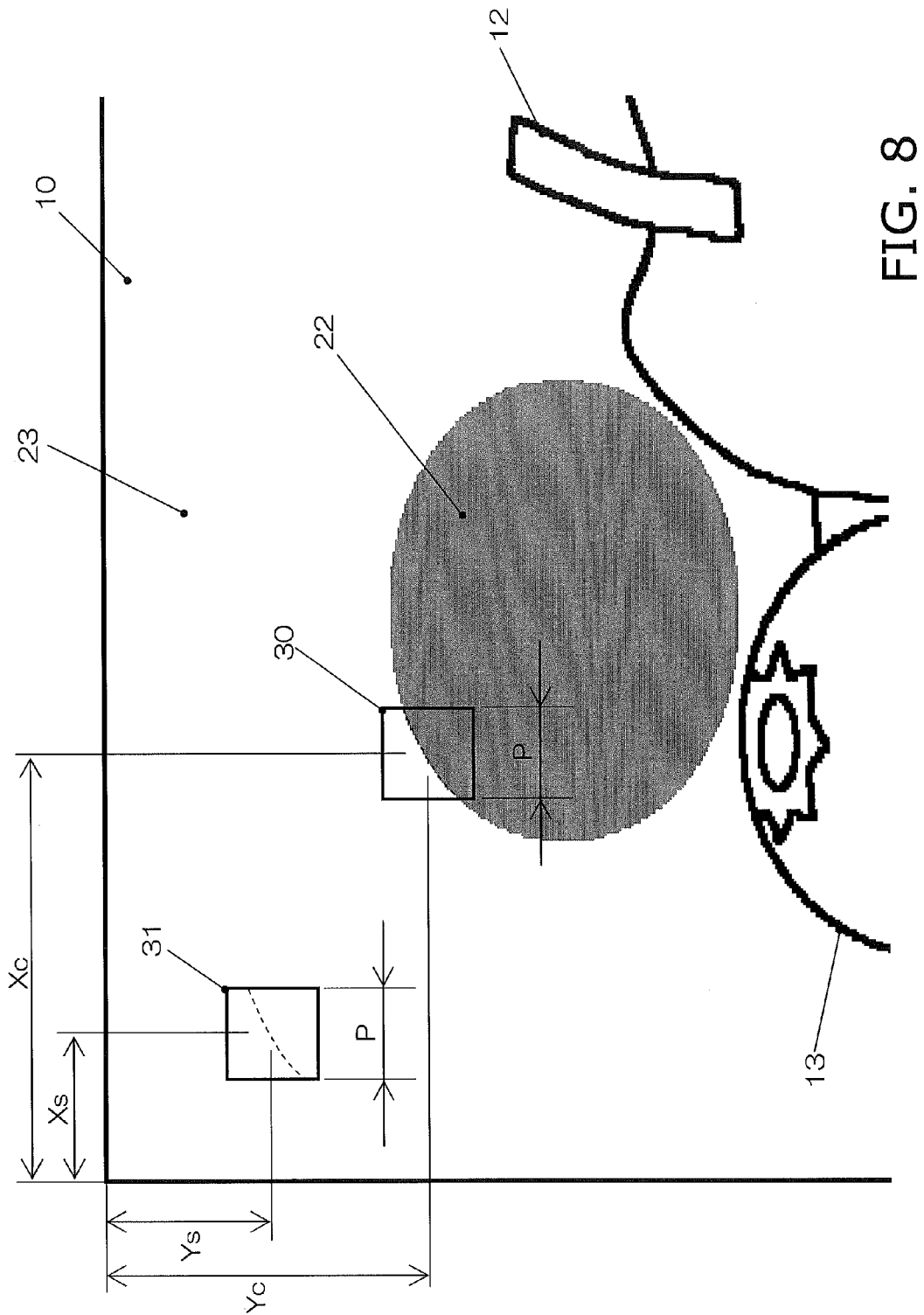
FIG. 8 is a diagram for describing the positions of removal/reference patches recorded as a patch history.

As a result of the above procedure, one set of the removal patch 30 and a corresponding reference patch 31 is selected, and therefore the control unit 2 records this result in the storage unit 4 as a patch history (step S303). It is sufficient that information such as that shown in FIG. 8 is recorded with a history number 1. Specifically, the central position (Xc,Yc) of the removal patch 30, the center (Xs,Ys) of the reference patch 31, and the size P of the removal patch (e.g., 16 pixels) are recorded.

Figure 9:
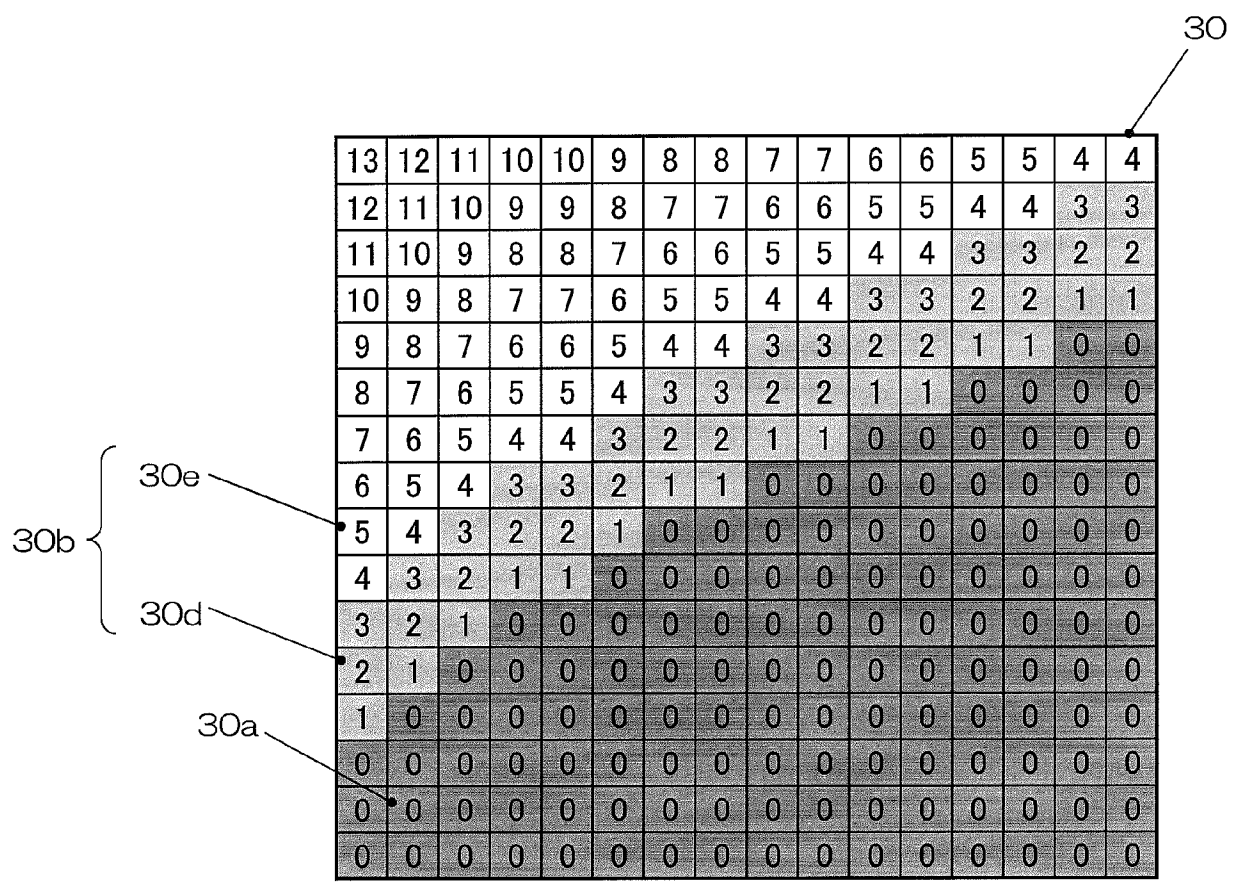

Next, the control unit 2 calculates a distance D from the removal region 30a for each pixel included in the non-removal region 30b of the removal patch 30 (step S304). FIG. 9 shows the result of calculating the distance D for all of the 16×16 pixels. In FIG. 9, the pixels included in the removal region 30a are marked with the distance D=0 (zero), and are shown in dark gray. On the other hand, the pixels included in the non-removal region 30b are marked with distance D numerical values indicating the shortest distance from the removal region 30a obtained as a city block distance (Manhattan distance).

Note that the present disclosure is not limited to using a city block distance in the method of calculating the shortest distance, and a normal distance (Euclidean distance) or the like may be used. The processing speed can be increased when using a city block distance since only integer arithmetic needs to be performed.

Also, when obtaining the shortest distance, it is sufficient to perform calculation using only the pixels included in the removal patch 30 (16×16 pixels). The processing speed can be increased since there is no need to calculate the distance for all of the pixels included in the reduced image 10 or the binary image 21 (640×480 pixels).

Next, the control unit 2 uses the following procedure to carry out inpainting processing on the removal patch 30 using the pixel values of the pixels in the reference patch 31 (step S305).

In the first process, the pixel values of the pixels in the removal region 30a of the removal patch 30 are replaced with the pixel values of the corresponding pixels in the partial region 31a of the reference patch 31. In FIG. 9, the portions shown in dark gray are pixels that are subjected to this process.

In the second process, among the pixels in the non-removal region 30b of the removal patch 30, the pixel values of the pixels for which the distance D is less than a predetermined threshold value Dw (e.g., Dw=4 pixels), that is to say D<Dw, are subjected to later-described blend processing that is performed using the pixel values of the corresponding pixels in the partial region 31*b* of the reference patch 31. A region 30*d* shown in light gray in FIG. 9 is made up of the pixels that are subjected to this process.

In the third process, among the pixels in the non-removal region 30*b* of the removal patch 30, the current pixel values are saved for the pixels for which the distance D is greater than or equal to the threshold value of Dw (i.e., D≥Dw). In other words, the pixels in a region 30*e* shown in white in FIG. 9 are not subjected to any processing.

Next, the blend processing will be described. Letting Pc be the pixel value of a pixel in the removal patch 30, and Ps be the pixel value of the corresponding pixel in the reference patch 31, the second process is executed according to Equation 1 below. D indicates the distance of this pixel.

$$Pc = \frac{D}{Dw}Pc + \frac{Dw-D}{Dw}Ps \quad \text{when } D < Dw \qquad \text{Equation 1}$$

Specifically, based on the distance D of the current pixel included in the non-removal region 30*b* of the removal patch 30, a blend ratio of the pixel value Pc of that pixel to the pixel value Ps of the corresponding pixel in the reference patch 31 is determined to be D/Dw to (Dw−D)/Dw. The result of blending Pc and Ps based on the determined blend ratio is then again substituted for the pixel value Pc. As can be seen from Equation 1, when distance D is D=0, then Pc=Ps, and this represents the first process. Also, when D=Dw, then Pc=Pc and there is no change in the pixel value, and this represents the third process. Accordingly, while the distance D changes from D=0 to D=Dw, the blend ratio of Pc to Ps changes according to the distance D. Accordingly, blended images in which the pixel value shifts from Pc to Ps are obtained between the first process and the third process.

Figure 10:
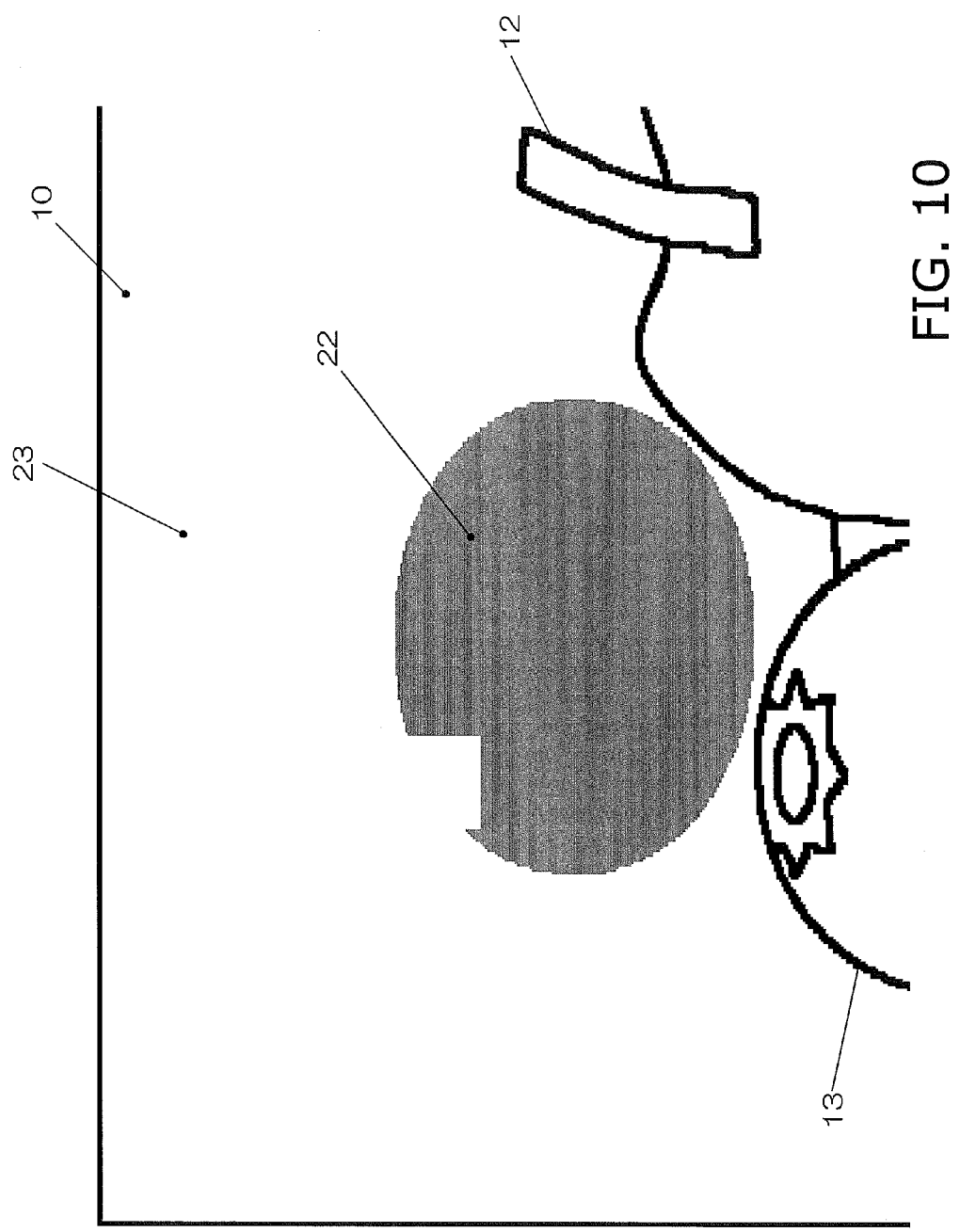
FIG. 10 is a diagram for describing a result of removal patch inpainting.

FIG. 10 shows the result of performing the inpainting processing on the removal patch 30 as described above. As a result of the first process described above, the removal region 30*a* of the removal patch 30 is replaced with the corresponding partial region 31*a* of the reference patch 31. Accordingly, the inpainting processing is performed on a portion of the removal region 22. Furthermore, since the second process described above is performed, the portion corresponding to the boundary 30*c* does not stand out unnaturally. In other words, even if there is a region 30*e* that does not change according to the third process described above, there is a region 30*d* that is a buffer region between the removal region 30*a* and the unchanging region 30*e*, and therefore the boundary 30*c* does not stand out unnaturally, and a natural processing result is obtained.

Note that the values of the distance D and the threshold value Dw need only be numerical values that are less than or equal to half the size S of the removal patch 30, that is to say satisfy the condition Dw<S/2. The higher the value of Dw is, the less likely the boundary is to stand out, but there is also a tendency for the calculation time to be longer and for the image to be more likely to look blurred.

Next, the control unit 2 updates the removal region 22 (step S306). Specifically, the binary image 21 that was generated in step S202 in FIG. 4 is updated. The pixels in the region of the removal region 22 that corresponds to the removal patch 30 are changed to the non-removal region 23 by changing their pixel values to 0. This processing is necessary for properly carrying out later-described step S307. This processing is also necessary for correctly calculating the distance D (step S304) in the second and successive iterations.

Next, the control unit 2 determines whether or not a removal region 22 remains (step S307). This determination may be performed by searching all of the pixels in the binary image 21 for a pixel having the value of 1. If even one pixel has the value of 1, a removal region 22 remains, and therefore the procedure returns to step S301, and processing is performed a second time.

2-4-2. Processing in Second Iteration

Figure 11:
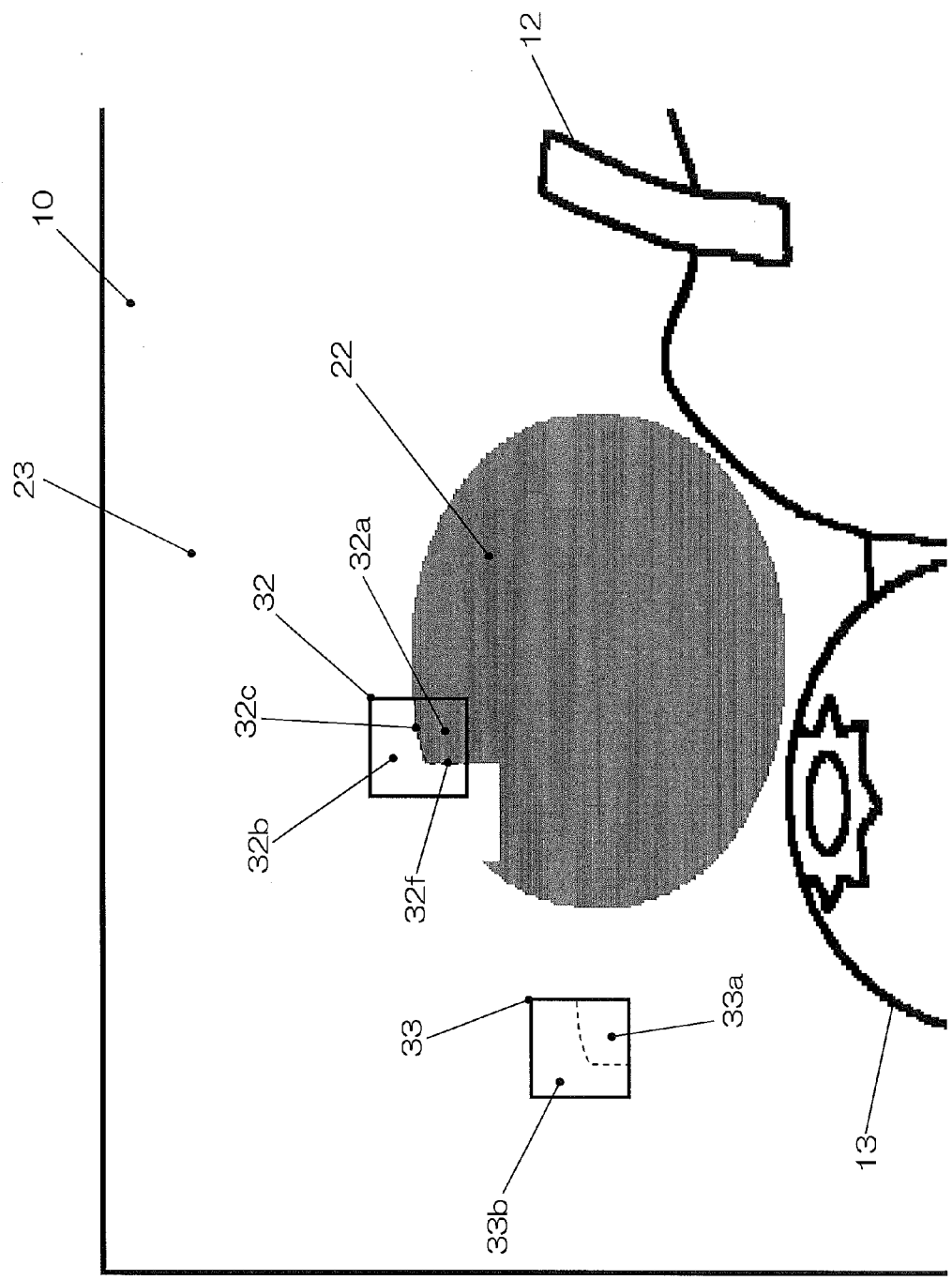
FIG. 11 is a diagram for describing the relationship between a second removal patch and a reference patch.

Similarly to the first iteration, the control unit 2 performs the processing of steps S301 to S306 shown in the flowchart of FIG. 6. Specifically, a square removal patch 32 whose center is on the edge portion of the removal region 22 is determined as shown in FIG. 11 (step S301). The removal patch 32 is constituted from the pixels that are included in a removal region 32*a* and the pixels that are included in a non-removal region 32*b*. Boundaries 32*c* and 32*f* between these two regions conform to the edge portion of the removal region 22. Here, the boundary 32*f* is a new boundary that appeared as a result of the processing in the first iteration. Specifically, it is a new boundary generated as a result of replacing the removal region 30*a* of the removal patch 30 with the corresponding partial region 31*a* of the reference patch 31.

Next, the control unit 2 selects a reference patch 33 that corresponds to the removal patch 32 (step S302). As described above, the reference patch 33 is selected based on the degree of similarity between the non-removal region 32*b* of the removal patch 32 and a corresponding partial region 33*b* of the reference patch 33.

Next, the control unit 2 records the removal patch 32 and the result of selecting the corresponding reference patch 33 with a history number 2 in the patch history (step S303).

Next, the control unit 2 calculates a distance D from the removal region 32*a* for each pixel included in the non-removal region 32*b* of the removal patch 32 (step S304). FIG. 12 shows the result of calculating the distance D for all of the 16×16 pixels. Since the removal region 22 is updated in step S306 in the first iteration, it is possible to calculate a distance D that also corresponds to the new boundary 32*f* that was generated in the first iteration.

Next, the control unit 2 uses the following procedure to carry out inpainting processing on the removal patch 32 using the pixel values of the pixels in the reference patch 33 (step S305).

In the first process, the pixel values of the pixels in the removal region 32*a* of the removal patch 32 are replaced with the pixel values of the corresponding pixels in the partial region 33*a* of the reference patch 33.

In the second process, among the pixels in the non-removal region 32*b* of the removal patch 32, the pixels for which the distance D is less than the predetermined threshold value Dw, that is to say D<Dw (the pixels in a region 32*d* in FIG. 12), are subjected to the blend processing in accordance with the calculation formula shown in Equation 1. Specifically, based on the distance D of the current pixel included in the non-removal region 32*b* of the removal patch 32, the blend ratio of the pixel value Pc of that pixel to the pixel value Ps of the corresponding pixel in the partial region 33*b* of the reference patch 31 is determined to be D/Dw to (Dw−D)/Dw. The result of blending Pc and Ps based on the determined blend ratio is then again substituted for the pixel value Pc.

In the third process, among the pixels in the non-removal region 32*b* of the removal patch 32, the current pixel values are saved for the pixels for which the distance D is greater than or equal to the threshold value of Dw. In other words, the pixels in a region 32*e* in FIG. 12 are not subjected to any processing.

Figure 13:
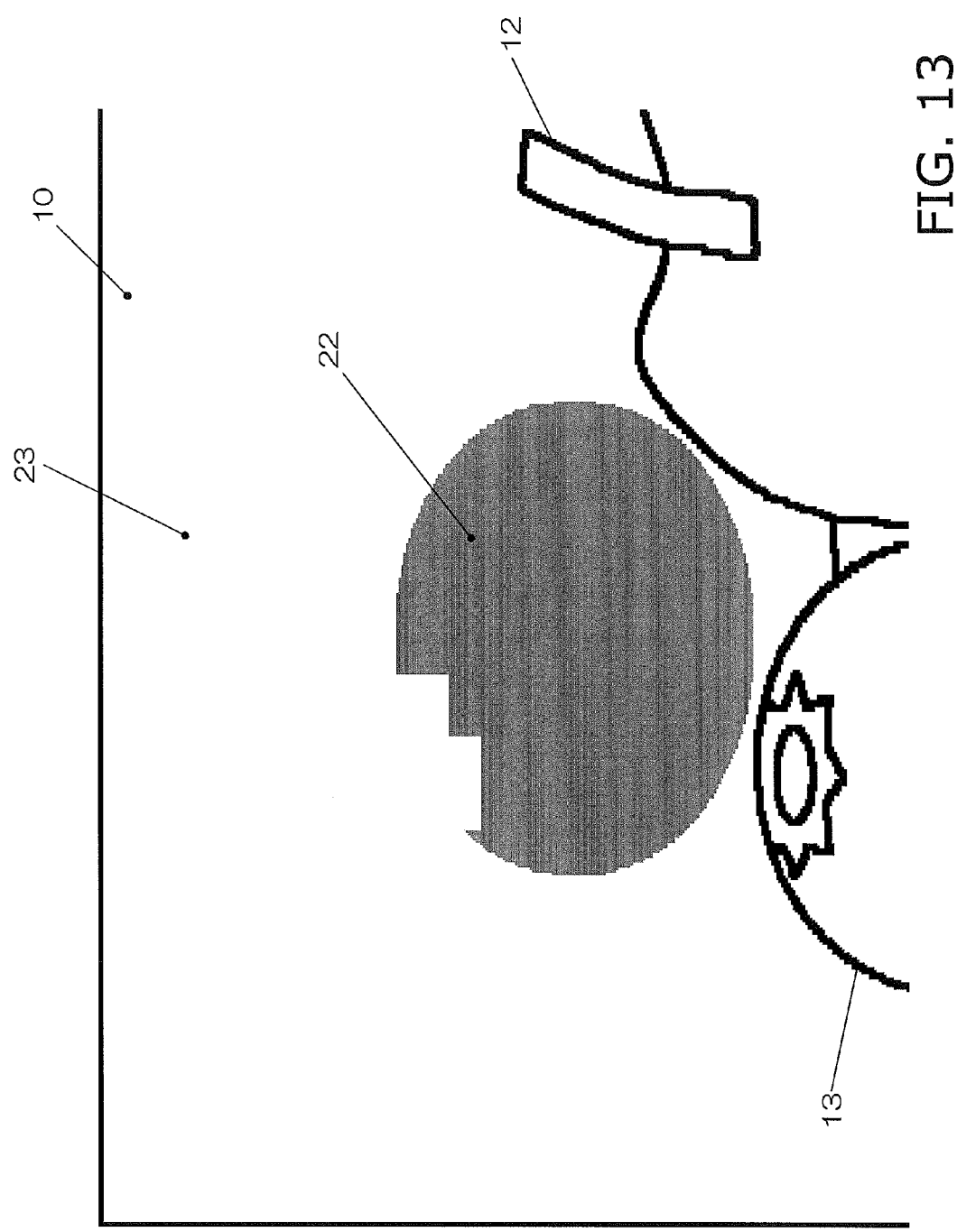
FIG. 13 is a diagram for describing a result of removal patch inpainting.

FIG. 13 shows the result of performing the inpainting processing on the removal patch 32 as described above. As a result of the first process described above, the removal region 32a of the removal patch 32 is replaced with the corresponding partial region 33a of the reference patch 33. Accordingly, the inpainting processing is performed on a portion of the removal region 22. Furthermore, since the second process described above is performed, the portion corresponding to the boundaries 32c and 32f does not stand out unnaturally. In other words, even if there is a region 32e that does not change according to the third process described above, there is a region 32d that is a buffer region between the removal region 32a and the unchanging region 32e, and therefore the boundaries 32c and 32f do not stand out unnaturally, and a natural processing result is obtained.

The boundary 32c shown in FIG. 11 is a boundary that already existed at the stage of the region designation processing in step S102 of FIG. 2. In contrast, the boundary 32f is a new boundary that was generated in the processing in the first iteration. However, in the image processing method of the present embodiment, the removal region 22 is always updated in step S305, and therefore the new boundary 32f that was generated does not stand out either, and a natural processing result is obtained.

Next, the control unit 2 updates the removal region 22 (step S306). In the binary image 21, the pixels in the region of the removal region 22 that corresponds to the removal patch 32 are changed to the non-removal region 23 by changing their pixel values to 0.

Figure 14:
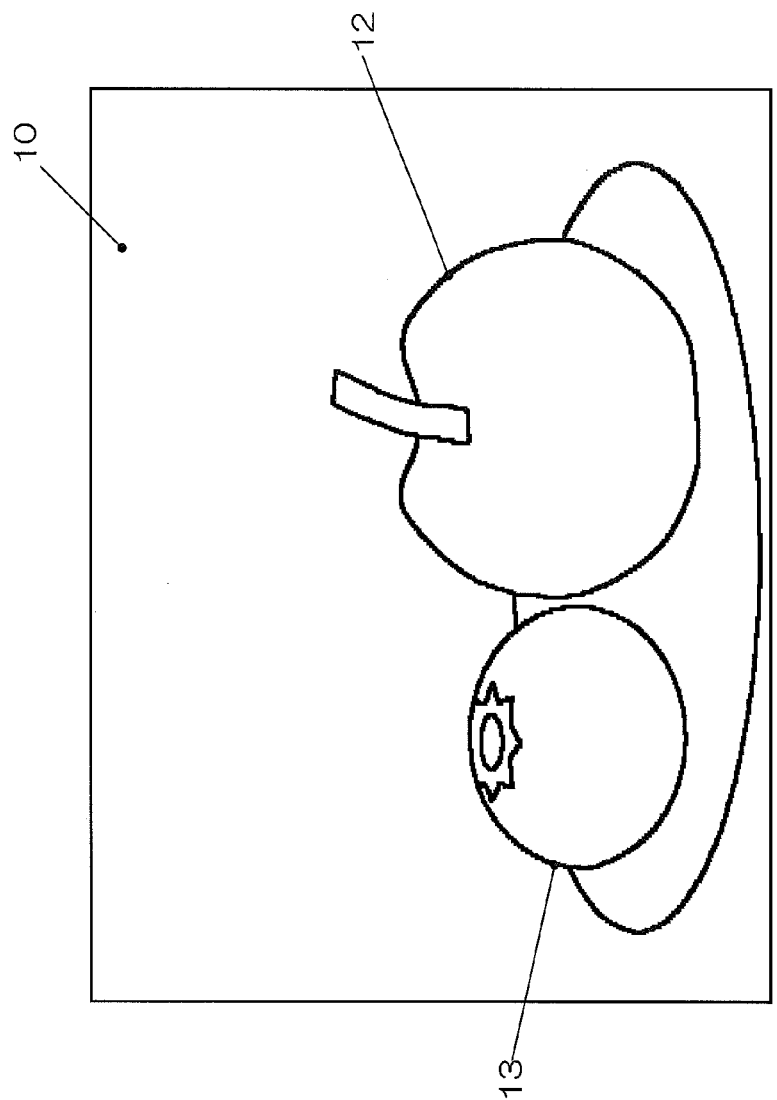
FIG. 14 is a diagram for describing a result of operations in the reduced image inpainting processing.

Next, the control unit 2 determines whether or not a removal region 22 remains (step S307). Steps S301 to S306 are then repeatedly executed until no removal region 22 remains. As a result, steps S301 to S306 are repeated N times. As shown in FIG. 14, a natural inpainting processing result in which the first subject 11 has been removed from the reduced image 10 is obtained.

As described above, with the image processing method of the present embodiment, the distance D from the removal region 22 is calculated for each pixel in the non-removal region 23 in the removal patch (step S304). The pixel values of the pixels in the removal region 22 of the removal patch are then replaced with the pixel values of the corresponding pixels in the reference patch (step S305), and among the pixels in the non-removal region 23 of the removal patch, pixels for which the distance D is less than the predetermined threshold value Dw (i.e., D<Dw) are subjected to the blend processing so as to be blended in accordance with the calculation formula shown in Equation 1 (step S305). As a result, the boundary between the removal region 22 and the non-removal region 23 in the removal patch does not stand out unnaturally, and a natural processing result is obtained.

Also, each time the pixel values of the pixels in the removal region 22 of the removal patch are replaced with the pixel values of the corresponding pixels in the reference patch, the removal region 22 is updated (step S306). As a result, new boundaries that are generated a result of the pixel value replacement (boundaries between the removal region 22 and the non-removal region 23) also do not stand out unnaturally, and a natural processing result is obtained.

2-5. Operations in Original Image Inpainting Processing

Figure 15:
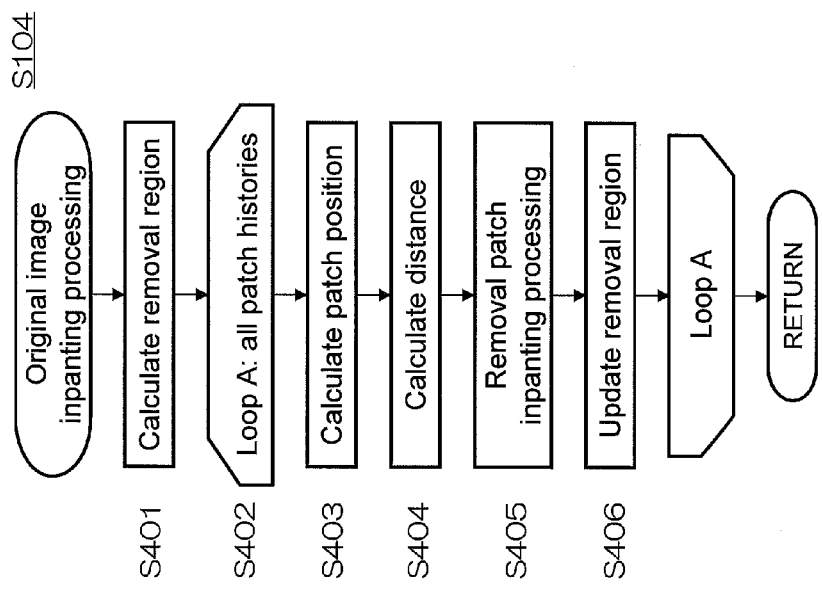
FIG. 15 is a flowchart showing operations in original image inpainting processing.

After performing the image inpainting processing (step S103 in FIG. 2) on the reduced image 10, the control unit 2 of the image processing apparatus 1 performs original image inpainting processing (step S104). FIG. 15 is a flowchart showing operations in inpainting processing performed on the original image First, the control unit 2 generates a binary image that has the same number of pixels as the original image by enlarging the binary image 21 that corresponds to the reduced image 10 to a factor of K (step S401). The enlargement factor K here is the inverse of the reduction factor 1/K in step S101 in FIG. 2. For example, if an image enlarged to a factor of 7 vertically and horizontally is generated from a binary image having 640 pixels vertically×480 pixels horizontally, a binary image having 4,480×3,360 pixels will be obtained. Note that the binary image 21 that is subjected to the enlargement processing is the binary image that was generated in step S202 in FIG. 4. In other words, the binary image that is subjected to the enlargement processing is the binary image 21 that includes the removal region 22 as shown in FIG. 5. The objective of step S401 is to enlarge the position and size of the removal region 22 to a factor of K.

Next, the control unit 2 performs the processing of loop A on all of the patch histories (step S402) that were recorded in the reduced image inpainting processing (step S103 in FIG. 2). The processing of loop A is executed the same number of times as the repetition number N (the repetition number N from steps S301 to S306 in FIG. 6) in the reduced image inpainting processing (step S103 in FIG. 2). The patch histories are reproduced in the order that they were recorded in the reduced image inpainting processing (step S103 in FIG. 2). The processing of steps S403, S404, S405, and S406 in FIG. 15 is then executed using the patch history that was recorded in step S303 in FIG. 6.

First, the control unit 2 calculates the positions and sizes of the removal patch and the reference patch with respect to the original image (step S403). The enlargement factor K of the reduced image 10 and the original image is used to perform the calculation shown below. Specifically, the central position of the removal patch 30 is calculated according to (K×Xc,K×Yc), the central position of the reference patch 31 is calculated according to (K×Xs,K×Ys), and the size of the removal patch is calculated according to K×P (e.g., 7×16=112 pixels).

Next, the control unit 2 calculates the distance D from the removal region for each pixel included in the non-removal region of the removal patch (step S404). For example, in the case of a removal patch made up of 112×112 pixels, the shortest distance D from the removal region calculated in step S401 is calculated as a city block distance.

Next, the control unit 2 uses the following procedure to carry out inpainting processing on the removal patch using the pixel values of the pixels in the reference patch (step S405).

In the first process, the pixel values of the pixels in the removal region of the removal patch are replaced with the pixel values of the corresponding pixels of the reference patch.

In the second process, among the pixels in the non-removal region of the removal patch, the pixel values of the pixels for which the distance D is less than the predetermined threshold value Dw (e.g., Dw=4 pixels) multiplied by a factor of M (i.e., D<M×Dw) are subjected to blend processing similar to that in Equation 1 using the pixel values of the corresponding pixels of the reference patch.

In the third process, among the pixels in the non-removal region of the removal patch, the current pixel values are saved for the pixels for which the distance D is greater than or equal to M×Dw (i.e., D≥M×Dw). In other words, the pixels in the region 30e shown in white in FIG. 9 are not subjected to any processing.

Next, the blend processing in step S405 will be described. Letting Pc be the pixel value of a pixel in the removal patch, and Ps be the pixel value of the corresponding pixel in the reference patch, the second process is executed according to Equation 2 below. D indicates the distance of this pixel.

$$Pc = \frac{D}{M \times Dw} Pc + \frac{M \times Dw - D}{M \times Dw} Ps \quad \text{when } D < M \times Dw \quad \text{Equation 2}$$

Specifically, based on the distance D of the current pixel included in the non-removal region of the removal patch, the blend ratio of the pixel value Pc of that pixel to the pixel value Ps of the corresponding pixel in the reference patch is determined to be D/(M×Dw) to (mxDw−D)/M×Dw. The result of blending Pc and Ps based on the determined blend ratio is then again substituted for the pixel value Pc.

Here, an enlargement factor M for the threshold value may be the same as the enlargement factor K of the reduced image 10 and the original image, that is to say M=K (e.g., M=7). Alternatively, M may be a numerical value smaller than K (e.g., M=4). The processing speed can be increased in this case.

Next, the control unit 2 updates the removal region (step S406). In the removal region that was calculated in step S401, the pixels in the region that corresponds to the removal patch are changed to the non-removal region by changing their pixel values to 0.

As described above, when the processing of steps S403, S404, S405, and 5406 has been carried out on all of the patch histories (step S402) that were recorded in the reduced image inpainting processing (step S103), original image inpainting processing is complete.

As described above, in the image processing method of the present embodiment, original image inpainting processing is completed by merely carrying out the processing of step S402 on all of the patch histories that were recorded in the reduced image inpainting processing (step S103 in FIG. 2). Accordingly, there is no need to again select a reference patch that corresponds to the removal patch. In other words, there is no need for processing that corresponds to step S302 in FIG. 6, thus making it possible to increase the processing speed.

Note that the degree of similarity is calculated for the removal patch and the reference patch in step 302. The effort for calculating this degree of similarity is proportional to the number of pixels. Also, the number of reference patches that are candidates is also proportional to the number of pixels. Accordingly, the calculation effort required to select a reference patch is proportional to the square of the number of pixels. Assume that processing corresponding to step S302 has been carried out on an original image. With an original image that is a factor of K (e.g., a factor of 7) of the reduced image 10, the number of pixels increases to the square of K (a factor of 49). Accordingly, a calculation effort corresponding to the fourth power of K (a factor of 2,401) is required to select a corresponding reference patch based on the removal patch enlarged to a factor of K.

Also, in the image processing method of the present embodiment, the distance D from the removal region is calculated for each pixel in the non-removal region of the removal patch (step S404). Then, the pixel values of the pixels in the removal region of the removal patch are replaced with the pixel values of the corresponding pixels of the reference patch (step S405), and among the pixels in the non-removal region of the removal patch, the pixel values of the pixels for which the distance D is less than M×Dw (i.e., D<M×Dw), are subjected to the blend processing so as to be blended in accordance with the calculation formula shown in Equation 2 (step S405). As a result, in the original image as well, the boundary between the removal region and the non-removal region in the removal patch does not stand out unnaturally, and a natural processing result is obtained.

3. Variations

Figure 16:
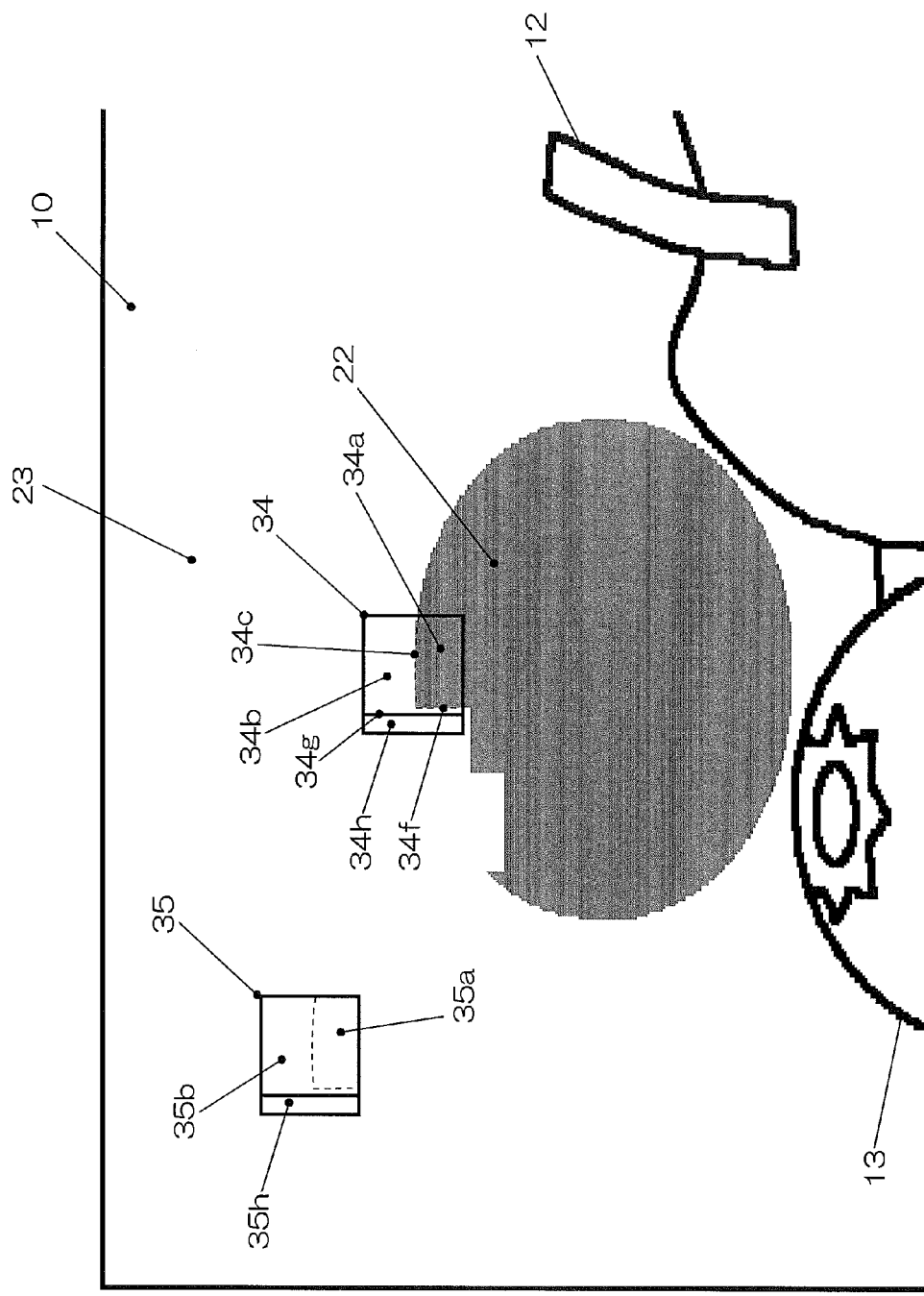
FIG. 16 is a diagram for describing the relationship between a third removal patch and a reference patch according to a variation.
Figure 17:
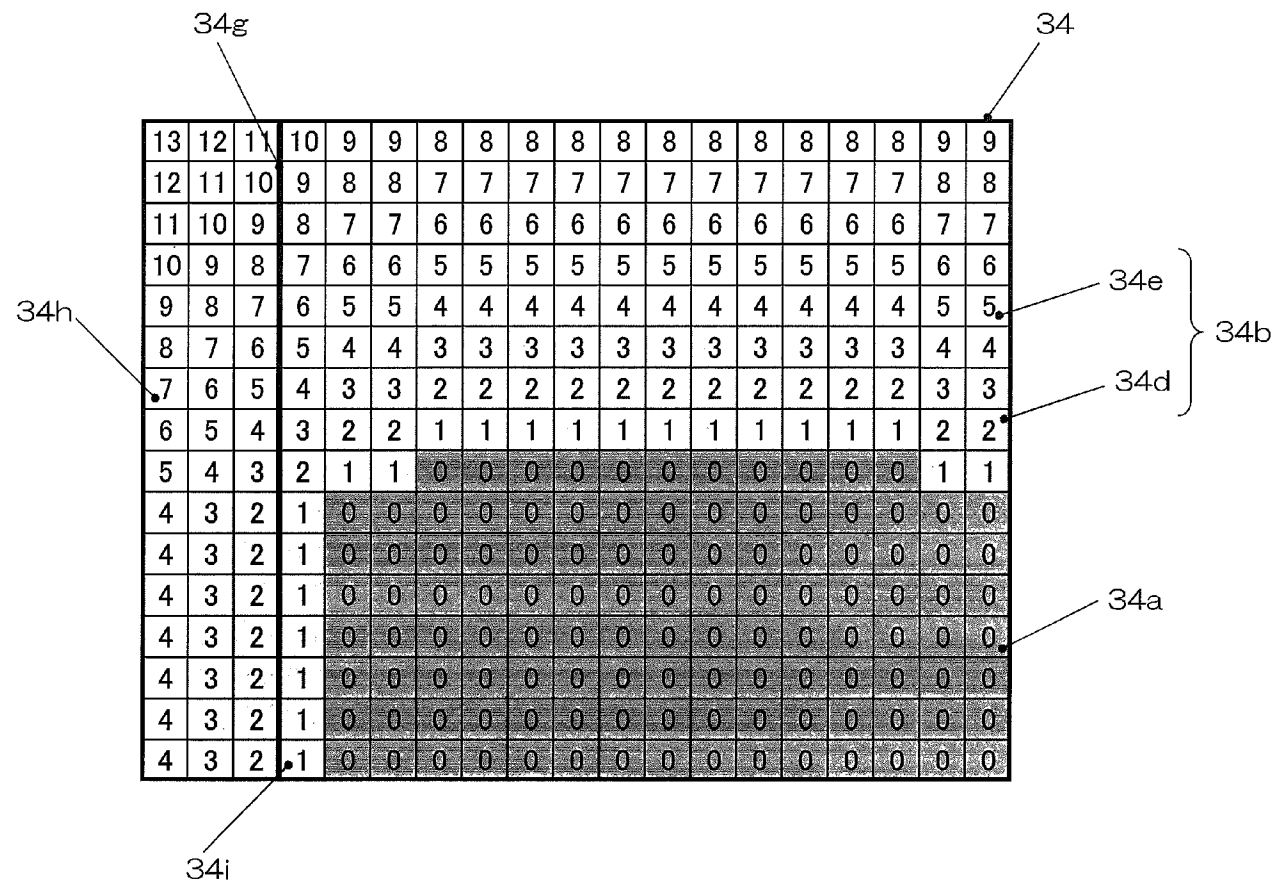

The processing of step S304 and step S305 in FIG. 6 described in the above embodiment, or the processing in step S404 and step S405 in FIG. 15 can be replaced with a processing method such as that described below. The following description takes the example of the reduced image inpainting processing of step S103 in FIG. 2. FIGS. 16 and 17 are diagrams for describing operations in this variation.

After the above-described processing in the second iteration, the determination result in step S307 is that a removal region 22 remains, and therefore the procedure returns to step S301, and processing is performed a third time. Similarly to the first and second iterations, the control unit 2 performs the processing of steps S301 to S306 shown in the flowchart of FIG. 6.

First, the control unit 2 determines a square removal patch 34 whose center is on an edge portion of the removal region 22 as shown in FIG. 16 (step S301). The removal patch 34 is constituted from the pixels that are included in a removal region 34a and the pixels that are included in a non-removal region 34b. Boundaries 34c and 34f between these two regions conform to the edge portion of the removal region 22.

Next, the control unit 2 selects a reference patch 35 that corresponds to the removal patch 34 (step S302). The removal patch 34 and the result of selecting the corresponding reference patch 35 are then recorded with a history number 3 in the patch history (step S303).

Next, the control unit 2 calculates a distance D from the removal region 34a for each pixel included in the non-removal region 34b of the removal patch 34 (step S304). Here, focus is placed on the positions of the boundaries 34c and 34f, and the region for calculating the distance D is expanded.

Specifically, if the boundary between the removal region 22 and the non-removal region 23 is in the vicinity of an end portion of the removal patch, the distance from the removal region 22 is calculated for the pixels in the periphery of the removal patch as well. Here, the determination of whether or not the boundary is in the vicinity of an end portion of the removal patch is made by measuring the distance in the direction orthogonal to the boundary.

In the example of FIG. 16, the boundary 34f is in the vicinity of a left end portion 34g of the removal patch 34. In view of this, an expanded region 34h made up of pixels on the left side of the removal patch 34 is added. Here, the width of the expanded region 34h is Dw−1 pixels (e.g., 3 pixels) relative to the threshold value Dw. FIG. 17 shows the results of calculating the distance D for 19 pixels horizontally due to the addition of the expanded region 34h, and 16 pixels vertically. It can be seen that among the pixels included in the removal patch 34, the distance D for a left end pixel 34i is D=1, which is less than Dw−1. However, the distance D for the pixel on the left end of the expanded region 34h is D=4, which is the same as the threshold value Dw.

Next, the control unit 2 uses the following procedure to carry out inpainting processing on the removal patch 34 using the pixel values of the pixels in the reference patch 35 (step S305).

In the first process, the pixel values of the pixels in the removal region 34a of the removal patch 34 are replaced with the pixel values of the corresponding pixels in the partial region 35a of the reference patch 35.

In the second process, among the pixels in the non-removal region 34b of the removal patch 34, the pixels for which the distance D is less than the predetermined threshold value Dw, that is to say D<Dw (the pixels in a region 34d in FIG. 17), are subjected to the blend processing in accordance with the calculation formula shown in Equation 1.

Furthermore, among the pixels in the expanded region 34h as well, the pixels for which the distance D is less than the predetermined threshold value Dw (i.e., D<Dw) are subjected to the blend processing in accordance with the calculation formula shown in Equation 1. Here, an expanded region 35h in the periphery (on the left side) of the reference patch 35 is provided in correspondence with the expanded region 34h provided in the periphery (on the left side) of the removal patch 34.

Specifically, based on the distance D of the current pixel included in the expanded region 34h, the blend ratio of the pixel value Pc of that pixel to the pixel value Ps of the corresponding pixel in the expanded region 35h is determined to be D/Dw to (Dw−D)/Dw. The result of blending Pc and Ps based on the determined blend ratio is then again substituted for the pixel value Pc.

In the third process, among the pixels in the non-removal region 34b of the removal patch 34, the current pixel values are saved for the pixels for which the distance D is greater than or equal to the threshold value of Dw. In other words, the pixels in a region 34e in FIG. 17 are not subjected to any processing.

In the expanded region 34h as well, the current pixel values are saved for the pixels for which the distance D is greater than or equal to the threshold value of Dw.

The control unit 2 performs inpainting processing on the removal patch 34 as described above. As a result of the first process described above, the removal region 34a of the removal patch 34 is replaced with the corresponding partial region 35a of the reference patch 35. Accordingly, the inpainting processing is performed on a portion of the removal region 22. Furthermore, since the second process described above is performed, the portion corresponding to the boundaries 34c and 34f does not stand out unnaturally, and a natural processing is obtained.

4. Conclusion

As described above, according to the image processing apparatus 1 of the above embodiment, the control unit 2 determines a removal patch that includes pixels in a removal region and pixels in a non-removal region (step S301 in FIG. 6), selects a reference patch that includes pixels in a non-removal region and corresponds to the removal patch (step S302 in FIG. 6), obtains the distance from the removal region for the pixels included in the non-removal region of the removal patch (step S304 in FIG. 6), and replaces the pixel values of the pixels in the removal region of the removal patch with the pixel values of the corresponding pixels of the reference patch (step S305 in FIG. 6). The control unit 2 sets the pixel values in the vicinity of the boundary between the removal region and the non-removal region in the removal patch to the result of blending the pixel values of pixels in the non-removal region of the removal patch with the pixel values of corresponding pixels of the reference patch based on the distances (step S305 in FIG. 6). Accordingly, in the image inpainting processing for removing an unnecessary object, the boundary between the removal region and the non-removal region does not standout, and a natural processing result is obtained.

Furthermore, according to the image processing apparatus 1 of the variation of the above embodiment, the control unit 2 obtains the distance from the removal region for pixels in the periphery of an end portion of the removal patch included in the non-removal region of the removal patch (step S304 in FIG. 6), and sets the pixel values of pixels in the periphery of the end portion of the removal patch to the result of blending the pixel values of the pixels in the periphery of the end portion of the removal patch with the pixel values of the corresponding pixels in the periphery of the end portion of the reference patch based on the distances (step S305 in FIG. 6). Accordingly, in the image inpainting processing for removing an unnecessary object, the boundary between the removal region and the non-removal region does not stand out, and a natural processing result is obtained.

Other Embodiments

Some or all of the processing in the above-described embodiments may be realized by computer programs. Also, some or all of the processing executed by the image processing apparatus 1 is executed by a processor such as a central processing unit (CPU) in a computer. Also, programs for executing the processing are stored in a storage device such as a hard disk or a ROM, and are executed in the ROM or read out to a RAM and then executed.

Also, the processing executed by the image processing apparatus 1 may be realized by hardware, or may be realized by software (including the case of being realized together with an OS (operating system), middleware, or a predetermined library). Furthermore, such processing may be realized by a combination of software and hardware.

The image processing apparatus 1 of the above-described embodiments may be realized as an image processing method or a computer program for causing a computer to execute image processing. Also, a computer-readable recording medium recording the program is encompassed in the present invention. Here, examples of the computer-readable recording medium include a flexible disk, a hard disk, a CD-ROM, an MO, a DVD, a DVD-ROM, a DVD-RAM, a BD (Blu-ray Disc), and a semiconductor memory.

The computer program is not limited to being recorded on the recording medium, and may be transmitted via, for example, an electrical communication line, a wireless or wired communication line, or a network typified by the Internet.

Also, the execution sequence of the image processing in the above-described embodiments is not necessarily limited to the description of the above embodiments, and the steps in the execution sequence can be interchanged without departing from the gist of the invention.

Embodiments have been described above as illustrative examples of techniques of the present invention. The accompanying drawings and detailed description have been provided for this purpose.

Accordingly, the constituent elements included in the accompanying drawings and the detailed description may include not only constituent elements that are essential to solving the problem, but also constituent elements that are not essential to solving the problem, in order to illustrate examples of the techniques. For this reason, these non-essential constituent elements should not be immediately found to be essential constituent elements based on the fact that they are included in the accompanying drawings or detailed description.

Also, the above-described embodiments are for illustrating examples of the techniques of the present invention, and therefore various modifications, substitutions, additions, omissions, and the like can be made within the scope of the claims or a scope equivalent thereto.

The present invention is applicable to electronic devices such as digital cameras, digital video cameras, personal computers, mobile phones, and information terminals.

General Interpretation Of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the image processing apparatus and image processing method. Accordingly, these terms, as utilized to describe the technology disclosed herein should be interpreted relative to the image processing apparatus and image processing method.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. An image processing apparatus that inpaints an inpainting target region in an image to be displayed, the image processing apparatus comprises:
    a display unit configured to display the image constituted by a predetermined number of pixels; and
    a control unit, the control unit executed by a processor of the imaging processing apparatus and configured to control the display unit,
    the control unit being configured to:
        determine a removal patch including a removal region that is the inpainting target region and a first non-removal region that is a region that does not include the removal region in the image to be displayed on the display unit;
        replace pixel values of pixels included in the removal region with pixel values of pixels outside the removal patch;
        calculate a shortest distance from the removal region for each of the pixels included in the first non-removal region;
        blend pixel values of the pixels included in at least a portion of the first non-removal region with the pixel values of the pixels outside the removal patch based on the calculated distance to obtain blended pixel values; and
        replace the pixel values of the pixels included in the at least a portion of the first non-removal region with the blended pixel values.

2. The image processing apparatus according to claim 1, wherein the control unit is further configured to:
    (i) determine a reference patch corresponding to the removal patch, the reference patch being constituted by a second non-removal region that is different from the first non-removal region and includes pixels corresponding to the pixels of the removal patch;
    (ii) replace the removal region with a non-removal region by replacing the pixel values of the pixels included in the removal region with pixel values of corresponding pixels in the second non-removal region of the reference patch; and
    (iii) blend the pixel values of the pixels included in the at least a portion of the first non-removal region with pixel values of corresponding pixels in the second non-removal region of the reference patch based on the calculated distance to obtain the blended pixel values; and
    (iv) replace the pixel values of the pixels included in the at least a portion of the first non-removal region with the blended pixel values.

3. The image processing apparatus according to claim 2, wherein the control unit is further configured to repeat the processes (i) to (iv) until all removal regions are excluded from the image.

4. The image processing apparatus according to claim 2, wherein the control unit is further configured to:
    calculate a shortest distance from the removal region for each of the pixels in the vicinity of and outside of a periphery of the removal patch;
    blend pixel values of the pixels in the vicinity of and outside of the periphery of the removal patch with pixel values of corresponding pixels in the vicinity of and outside of a periphery of the reference patch based on the calculated distance to obtain blended pixel values; and
    replace the pixel values of the pixels included in the vicinity of and outside of the periphery of the removal patch with the blended pixel values.

5. The image processing apparatus according to claim 2, wherein the control unit is further configured to display a reduced image as the image, the reduced image being obtained by reducing an original image to 1/K wherein the original image is evenly divided into square blocks made up of K×K pixels.

6. The image processing apparatus according to claim 5, wherein the control unit is further configured to:
    store a history information including at least a size of the removal patch, a position of the removal patch, and a position of the reference patch; and
    perform inpainting on a target region of the original image based on the stored history information, the original image being obtained by enlarging the reduced image K times.

7. The image processing apparatus according to claim 6, wherein the control unit is further configured to perform a same number of inpainting processes on the target region of the original image as on the reduced image.

8. The image processing apparatus according to claim 2, wherein the control unit is further configured to determine the reference patch based on similarity between pixel values of the pixels included in the first non-removal region and pixel values of pixels included in the reference patch.

9. The image processing apparatus according to claim 2, wherein the reference patch includes a same number of pixels as the removal patch.

10. The image processing apparatus according to claim 1, wherein the control unit is further configured to:
    replace pixel values of the pixels included in the first non-removal region with the blended pixel values when the calculated distance is less than a predetermined value; and
    leave the pixel values of the pixels included in the first non-removal region when the calculated distance is equal to or greater than the predetermined value.

11. An image processing method for inpainting an inpainting target region in an image to be displayed on a display unit, the image processing method including:
    determining a removal patch including a removal region that is the inpainting target region and a non-removal region that is a region that does not include the removal region in the image to be displayed on the display unit;
    replacing pixel values of pixels included in the removal region with pixel values of pixels outside the removal patch;
    calculating a shortest distance from the removal region for each of the pixels included in the non-removal region;
    blending pixel values of the pixels included in at least a portion of the non-removal region with the pixel values of the pixels outside the removal patch based on the calculated distance to obtain blended pixel values; and
    replacing the pixel values of the pixels included in the at least a portion of the non-removal region with the blended pixel values.

* * * * *